US012752218B2

(12) United States Patent
Strozyk et al.

(10) Patent No.: US 12,752,218 B2
(45) Date of Patent: Oct. 6, 2026

(54) APPARATUS WITH INTEGRATED CONDENSER AND SEPARATOR

(71) Applicant: L'Air Liquide, Société Anonyme pour l'Etude et l'Exploitation des Procédés Georges Claude, Paris (FR)

(72) Inventors: Michael Strozyk, Offenbach (DE); Tobias Oelmann, Bad Vilbel (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 461 days.

(21) Appl. No.: 18/235,170

(22) Filed: Aug. 17, 2023

(65) Prior Publication Data

US 2024/0066429 A1 Feb. 29, 2024

(30) Foreign Application Priority Data

Aug. 26, 2022 (EP) .................................... 22192275

(51) Int. Cl.
*B01D 5/00* (2006.01)

(52) U.S. Cl.
CPC ........... *B01D 5/009* (2013.01); *B01D 5/0015* (2013.01); *B01D 5/0069* (2013.01); *B01D 5/0084* (2013.01)

(58) Field of Classification Search
CPC ........................................................ B01D 5/00
See application file for complete search history.

(56) References Cited

U.S. PATENT DOCUMENTS 4,743,432 A 5/1988 Vollhardt
4,764,192 A * 8/1988 Heisel ................ C01B 17/0447 96/201
5,507,356 A 4/1996 Roth et al.
(Continued)

FOREIGN PATENT DOCUMENTS

DE 40 32 120 4/1992
DE 43 00 131 7/1995
(Continued)

OTHER PUBLICATIONS

Omega Thermo Products. "Pillow Plates" Wayback Machine capture Aug. 14, 2020 (Year: 2020).*
(Continued)

*Primary Examiner* — Donald R Spamer
(74) *Attorney, Agent, or Firm* — Allen E. White; Elwood L. Haynes

(57) ABSTRACT

The invention relates to an apparatus for separating a condensable reaction product from a process gas mixture. The apparatus includes a pressure jacket having an interior, wherein two process units are arranged one atop the other in the pressure jacket. The upper first process unit is configured for condensing the liquid reaction product from the process gas mixture and is thus in the form of a plate heat exchanger. The plate heat exchanger includes vertically arranged plates traversable by a cooling medium. The plates have plate interiors which are traversable by the cooling medium. Adjacent plates spaced apart from one another define plate interspaces which are traversable by the process gas mixture. The lower second process unit is configured for separating the reaction product condensed in the first process unit and is thus in the form of a gas-liquid separator.

6 Claims, 2 Drawing Sheets

(56) References Cited

U.S. PATENT DOCUMENTS

| | | | | |
|---|---|---|---|---|
| 5,874,051 | A | 2/1999 | Heil et al. | |
| 6,883,788 | B1 | 4/2005 | Tagamolila et al. | |
| 2002/0048541 | A1 | 4/2002 | Schodel et al. | |
| 2009/0321057 | A1 * | 12/2009 | Daly .................... | B01D 5/0012 165/111 |
| 2013/0206577 | A1 | 8/2013 | Bauer et al. | |
| 2015/0129185 | A1 | 5/2015 | Abker et al. | |
| 2020/0197890 | A1 | 6/2020 | Castillo-Welter et al. | |

FOREIGN PATENT DOCUMENTS

| | | |
|---|---|---|
| DE | 197 12 148 | 7/1998 |
| DE | 198 30 163 | 1/2000 |
| DE | 101 35 716 | 2/2003 |
| DE | 10 2007 031766 | 2/2008 |
| DE | 10 2010 026835 | 1/2012 |
| DE | 10 2016 005999 | 11/2017 |
| EP | 2 845 634 | 3/2015 |
| EP | 3 401 299 | 11/2018 |
| JP | S60 168530 | 9/1985 |

OTHER PUBLICATIONS

MTE Column Internals PDF uploaded Nov. 2020 (Year: 2020).*
European Search Report for corresponding EP 22192275, Jan. 31, 2023.

* cited by examiner

APPARATUS WITH INTEGRATED CONDENSER AND SEPARATOR

CROSS REFERENCE TO RELATED APPLICATIONS

This application claims the benefit of priority under 35 U.S.C. § 119 (a) and (b) to European Patent Application No. 22192275.0, filed Aug. 26, 2022, the entire contents of which are incorporated herein by reference.

TECHNICAL FIELD OF THE INVENTION

The invention relates to an apparatus for separating a condensable reaction product from a process gas mixture, in particular for separating raw methanol from a process gas mixture.

BACKGROUND

In non-integrated solutions for producing condensable reaction products, for example raw methanol, the individual process steps are carried out in separate individual positions or individual apparatuses. For the example of methanol synthesis these process steps consist at least of the reaction of synthesis gas to afford methanol, the cooling of the reaction mixture to condense raw methanol and the separation of the condensed raw methanol from unreacted synthesis gas (residual gas) and inert constituents of the gas mixture.

When using individual apparatuses, process media of the process unit are introduced via ports into a pressure apparatus and from there into the respective inner apparatus components, distributed or collected there and subsequently discharged. This is effected via dedicated apparatus openings and internals relevant to the respective apparatus and via connecting elements such as pipe conduits and, depending on the relative position of the process units, via further conveying means such as pumps.

Combining a plurality of process units accordingly requires a plurality of pressure apparatuses and external pipe conduits which require separate manufacture and installation on foundations or in constructional steelwork within a plant. This leads to high costs in terms of required capital expenditure (CAPEX) and also operating expenditure (OPEX). This is especially due to the multiplicity of required pressure jackets and ports and also pipe conduits and conveying means. These factors result in high pressure drops and heat losses over the associated large total volume and the associated large total surface area and in a higher energy input for the required conveying means.

SUMMARY

It is an object of the present invention to at least partially overcome the aforementioned disadvantages of the prior art.

It is a further object of the present invention to provide an apparatus which makes it possible to reduce the number of connecting pipe conduits, individual pressure jackets and apparatus sumps.

It is a further object of the present invention to provide an apparatus which fulfills at least two process functions while having the lowest possible total volume and the lowest possible total surface area.

It is a further object of the present invention to provide an apparatus which requires the lowest possible total manufacturing time with respect to fulfilling at least two process functions.

It is a further object of the present invention to provide an apparatus which requires the lowest possible number of conveying means, if any, with respect to the process functions to be fulfilled.

It is a further object of the present invention to provide an apparatus which is constructed such that material stresses in the metal-based components are minimized.

The independent claims make a contribution to the at least partial achievement of at least one of the above objects. The dependent claims provide preferred embodiments which contribute to the at least partial achievement of at least one of the objects. Preferred embodiments of constituents of one category according to the invention are, where relevant, likewise preferred for identically named or corresponding constituents of a respective other category according to the invention. The terms "having", "comprising" or "containing", etc., do not preclude the possible presence of further elements, ingredients, etc. The indefinite article "a" does not preclude the possible presence of a plurality.

A first aspect of the invention proposes an apparatus for separating a condensable reaction product from a process gas mixture, comprising

- a pressure jacket having an interior, wherein at least two fluidically interconnected process units are arranged one atop the other in the interior;
- a first process unit, wherein the first process unit is configured for condensing the reaction product from the process gas mixture and
- the first process unit is in the form of a plate heat exchanger and the first process unit comprises a multiplicity of plates arranged vertically and parallel to one another with traversable plate interiors and plate interspaces are present between adjacent plates, wherein the plate interspaces are traversable from top to bottom by the process gas mixture and the plate interiors are traversable, preferably traversable from bottom to top, by a cooling medium;
- a second process unit arranged below the first process unit, wherein the second process unit is fluidically connected to the plate interspaces of the first process unit and wherein the second process unit is in the form of a gas-liquid separator and is configured for separating the condensed reaction product obtainable in the first process unit from a residual gas.

According to the invention a "multiplicity" of plates is to be understood as meaning a plurality of plates, but preferably more than two plates, in particular at least plates, or at least 10 plates, or at least 25 plates, or at least 50 plates.

The at least two process units in the interior of the pressure jacket include the first and the second process unit.

According to the invention two process units are integrated in a common pressure jacket. A pressure jacket is to be understood as meaning an encasing structure capable of withstanding relatively high internal pressures, in particular internal pressures markedly above standard pressure, for example pressures of more than 5 bar.

The first process unit fulfills the function of condensing a condensable reaction product from a process gas mixture. The first process unit thus especially fulfills the function of a condenser. To fulfill this function the first process unit is in the form of a plate heat exchanger.

Two adjacent plates are spaced apart from one another such that a plate interspace is formed between two adjacent plates. The plate interspaces are traversable from top to bottom by the process gas mixture and the plate interspaces are traversable, preferably traversable from bottom to top, by a cooling medium. In other words the apparatus comprises means configured such that the plate interspaces are traversable from top to bottom by the process gas mixture and the plate interiors are traversable, preferably traversable from bottom to top, by the cooling medium. The plate interiors of the first process unit are preferably traversable in the vertical direction, in particular traversable by the cooling medium from bottom to top in the vertical direction. The plate interspaces of the first process unit are preferably traversable in the vertical direction, in particular traversable by the process gas mixture from top to bottom in the vertical direction.

The second process unit fulfills the function of separating the condensed or condensable reaction product from a residual gas. The second process unit thus fulfills the function of a gas-liquid separator and is configured as such a separator.

In the second process unit a liquid reaction product is thus separated from remaining gaseous constituents. In one example the process gas mixture is a gaseous reaction product from an upstream methanol synthesis having synthesis gas (hydrogen, carbon monoxide, carbon dioxide) as the reactant gas mixture. In this example the process gas mixture contains

- raw methanol as condensable reaction product comprising methanol, water and condensable byproducts,
- a residual gas comprising unconverted synthesis gas, inert constituents and uncondensable byproducts.

The first and second process unit are arranged one atop the other within the pressure jacket, wherein the second process unit is arranged below the first process unit. Both process units are fluidically interconnected. In particular the first and second process unit are fluidically interconnected in respect of the process gas mixture and constituents condensable therefrom.

The first and second process unit are preferably arranged in serial alignment, i.e. along a straight line or axis common to the first and second process unit. The second process unit is thus preferably arranged such that it is not offset relative to the first process unit and vice versa.

In the first process unit raw methanol for example is condensed from a hot process gas mixture by cooling with the cooling medium preferably run in countercurrent to the process gas mixture. In the second process unit the raw methanol for example is separated from the thus-obtained mixture. Within the pressure jacket the first process unit which in operation especially has a higher temperature is spaced apart from the second process unit which in operation is especially cooler, but is fluidically connected thereto.

In operation a temperature gradient from an upper warmer zone to a cooler lower zone is established. Since the process gas mixture enters the first process unit at the top of the apparatus initially uncooled or at best precooled by upstream process units the top region of the apparatus has the highest temperatures in operation. The hot process gas mixture entering at the top of the apparatus is initially gaseous while in the direction of the bottom of the apparatus it has an ever greater tendency to change phase by progressive cooling, i.e. an ever larger proportion of reaction product condenses from the process gas mixture.

Since the density of a medium at higher temperatures is relatively lower than the density of the same medium at lower temperatures a density gradient from a low density in an upper zone of the apparatus to a higher density in a lower zone of the apparatus is also established during operation. This favours the intended flow direction of the condensing process gas mixture on the side of the plate interspaces from top to bottom since heavier components collect in a lower region of the apparatus due to the effect of gravity. Finally, the intended flow direction of the process gas mixture is further also favoured by the vertical arrangement of the plates of the first process unit.

The combination of the abovementioned effects makes it possible in respect of the apparatus according to the invention to completely dispense with a forced-flow conveying means, for example a pump, on the side of the process gas mixture. This applies to the first and the second process unit. The separation of the liquid reaction product from the residual gas in the second process unit is effected according to the principle of gravity and therefore requires no forced-flow conveying means.

Furthermore the apparatus according to the invention requires only a single pressure jacket for two process functions (condensation and separation).

The advantages of the apparatus according to the invention also extend to the conduction of the cooling medium. The cooling medium is preferably conducted from bottom to top on the side of the plate interiors of the traversable plates while the process gas mixture to be cooled is conducted from top to bottom on the side of the plate interspaces. The cooling medium thus preferably enters into the process unit in a lower region thereof and preferably exits therefrom in an upper region. From bottom to top in the flow direction it is thus continuously warmed and/or continuously converted from a liquid phase into a gaseous phase through the cooling of the process gas mixture. The abovementioned temperature gradient is thus established both on the side of the plate interiors and on the side of the plate interspaces of the first process unit for this case.

The temperature gradient established in operation by the inventive arrangement of the first and second process unit and the inventive flow management is observed not only in the flowing media but correspondingly also in the metallic structures of the apparatus. Since the temperature gradient continuously declining from an upper region to a lower region is also observed in the metallic structures of the apparatus and exhibits no temperature spikes, possible thermal stresses due to locally occurring large temperature differences are reduced to a minimum. The first and second process unit and the pressure jacket are in particular manufactured from a metal or a metal alloy. It is preferable when at least the media-conducting components of the first and second process unit and the pressure jacket are manufactured from a metal or a metal alloy.

One embodiment of the apparatus according to the invention is characterized in that the apparatus comprises a support structure, wherein the support structure is in the form of a propping means arranged at least partially below a process unit or in the form of a suspending means arranged at least partially above a process unit and thus forms a mechanical connection between a process unit and the pressure jacket or the support structure is in the form of a connecting element arranged at least partially between the first and second process unit and thus forms a mechanical connection between both process units and the pressure jacket.

In the context of the present invention a “support structure” may alternatively also be referred to as a “support element”.

In this embodiment the support structure is in the form of a suspending means, a propping means or a connecting element. In the case of a suspending means the support structure is arranged at least partially, i.e. partially or completely, above the respective process unit. In the case of a propping means the support structure is arranged at least partially, i.e. partially or completely, below the respective process unit.

In one example of this embodiment the support structure is in the form of a propping means arranged at least partially below a process unit and thus forms a mechanical connection between a process unit and the pressure jacket. The respective process unit, i.e. the first and/or second process unit, can then advantageously expand freely upwards in the vertical direction within the pressure jacket.

In a further example of this embodiment the support structure is in the form of a suspending means arranged at least partially above a process unit and thus forms a mechanical connection between a process unit and the pressure jacket. The respective process unit, i.e. the first and/or second process unit, can then advantageously expand freely downwards in the vertical direction within the pressure jacket.

In a further example of this embodiment the support structure is in the form of a connecting element arranged at least partially between the first and second process unit and thus forms a mechanical connection between both process units and the pressure jacket. The first process unit can then advantageously expand freely upwards in the vertical direction within the pressure jacket and the second process unit can then advantageously expand freely downwards in the vertical direction within the pressure jacket.

The mechanical connection between the respective process unit and the pressure jacket may be a friction-locked connection and/or an atomic-level connection. One example of a friction locked connection is a screw connection. One example of atomic level connection is a weld connection.

A further embodiment of the apparatus according to the invention is characterized in that the apparatus comprises a support structure, wherein the support structure is in the form of a propping means arranged at least partially below the second process unit or in the form of a suspending means arranged at least partially above the first process unit and thus forms a mechanical connection between the respective process unit and the pressure jacket, and the apparatus comprises a connecting element arranged at least partially between the first and second process unit, wherein the connecting element forms a mechanical connection between the first process unit and the second process unit.

In this embodiment the apparatus includes a support structure arranged either at least partially above the first process unit or at least partially below the second process unit. The connecting element effects merely a mechanical connection between the first and second process unit. Depending on the arrangement and securing of the support structure the entire construction can accordingly expand freely downwards or freely upwards in the case of thermal heating in operation.

One embodiment of the apparatus according to the invention is characterized in that the plates of the first process unit are in the form of pillow plates.

Pillow plates instead of conventional straight heat exchanger plates provide advantages in respect of mechanical stability and efficiency of heat transfer especially in terms of the apparatus according to the invention. Pillow plates especially combine a high external pressure resistance with the possibility of flexible arrangement. Pillow plate heat exchangers are more particularly described in DE 10 2016 005 999 A1.

One embodiment of the apparatus according to the invention is characterized in that the first process unit comprises a first and a second compartment, wherein said compartments are configured such that plate interspaces of the first compartment are traversable from top to bottom by the process gas mixture and plate interspaces of the second compartment are traversable from bottom to top by a residual gas dischargeable from the second process unit, as a result of which further reaction product is condensable from the residual gas in the plate interspaces of the second compartment.

The plate interspaces of the first compartment are traversable from top to bottom by the process gas mixture and the plate interspaces of the second compartment are traversable from bottom to top by a residual gas dischargeable from the second process unit. In other words the apparatus of this embodiment comprises means configured such that the plate interspaces of the first compartment are traversable from top to bottom by the process gas mixture and the plate interspaces of the second compartment are traversable from bottom to top by a residual gas dischargeable from the second process unit.

The second compartment of the first process unit fulfills the function of an aftercooler. The first compartment of the first process unit continues to fulfill the function of a condenser. Both compartments are in the form of plate heat exchangers.

The plate interiors of the plates of the second compartment are preferably traversable from bottom to top by the cooling medium. In other words the apparatus of this embodiment comprises means configured such that the plate interiors of the second compartment are preferably traversable from bottom to top by the cooling medium.

In this embodiment the first process unit, i.e. the first process unit in the form of a heat exchanger, is subdivided into a first and second compartment. The first compartment serves the cooling of the process gas mixture in the plate interspaces of this first compartment and thus likewise the condensing of the condensable reaction product. The second compartment of the first process unit is configured such that the residual gas dischargeable from the second process unit may be conducted from bottom to top on the side of the plate interspaces of the second compartment. The second compartment fulfills the function of an aftercooler, i.e. is configured as an aftercooler.

The plate interspaces of the plates of the second compartment are configured such that these are traversable from bottom to top by the residual gas. The plate interspaces of the plates of the second compartment are especially configured such that these are traversable from bottom to top in the vertical direction by the residual gas. This causes further liquid reaction product to condense out of the residual gas through cooling with the cooling medium conducted on the plate inside. The residual gas and the cooling medium are preferably run in cocurrent. This results in a supercooling or aftercooling of the residual gas discharged from the second process unit which is saturated with gaseous reaction product before introduction into the second compartment. The condensed-out reaction product "falls" downwards on account of the vertical arrangement of the heat exchanger plates and collects in the bottom of the second process unit, the separator. Since the second compartment in the upper region of the first process unit has the highest temperature on account of the process gases entering in the top region of the first process unit and the conducting of the cooling medium in the second compartment from bottom to top any entrained liquid droplets of the reaction product are advantageously evaporated in this upper region of the first process unit. This prevents the residual gas exiting the second compartment of the first process unit as a biphasic flow (gaseous/liquid). This reduces the risk of damage to compressors arranged downstream. Furthermore connecting pipe conduits arranged in this region may have smaller diameters since single-phase flows (gaseous) allow higher velocities in pipe conduits.

In this embodiment the efficiency of the separation in the second process unit is increased through interaction with the second compartment of the first process unit. This is particularly advantageous since the smaller proportion of condensable constituents in the residual gas protects any compressors connected downstream (see above) or these need not be configured for operation with moist gases in the first place. This saves capital costs in respect of such compressors.

In this connection one embodiment of the apparatus according to the invention is characterized in that the interior of the pressure jacket has a drying apparatus arranged in it, wherein the drying apparatus is fluidically connected to the plate interspaces of the second compartment.

A drying apparatus fluidically connected to the plate interspaces of the second compartment further improves the efficiency of the separation in the second process unit. The drying apparatus is in particular a droplet separator or demister which fulfills the function of agglomerating small liquid droplets into larger liquid drops. The droplet separator or demister may thus also be referred to as an agglomerator, i.e. fulfills the function of an agglomerator.

The thus-producible larger liquid droplets subsequently flow downwards through the plate interspaces of the second compartment to the second process unit, i.e. are discharged downwards to the second process unit.

The drying apparatus preferably provides a large warm metallic surface. Very small droplets which are not agglomerated are evaporated and exit the second compartment of the first process unit in the gas phase.

The drying apparatus, in particular the droplet separator or demister, is therefore advantageously arranged above the first process unit, in particular above the second compartment of the first process unit. The drying apparatus is especially arranged downstream of the second compartment of the first process unit in the flow direction of the residual gas.

Since the drying apparatus of the second compartment is arranged downstream of the second compartment in the flow direction of the residual gas this also serves as an additional safety device to prevent the residual gas being discharged from the second compartment of the first process unit as a biphasic mixture (gaseous/liquid). Liquid which optionally does not evaporate in the upper region of the second compartment is agglomerated in the drying apparatus and thus passed into the second process unit or evaporated.

One embodiment of the apparatus according to the invention is characterized in that the apparatus has a process gas inlet port, wherein the process gas inlet port is fluidically connected to the plate interspaces of the first process unit and extends through the pressure jacket, wherein the process gas inlet port is arranged at the top of the apparatus so that the process gas mixture can enter the first process unit at the top thereof.

A process gas inlet port required for supplying the process gas mixture to the first process unit is preferably arranged at the top of the apparatus, in particular at the top of the first process gas unit.

One embodiment of the apparatus according to the invention is characterized in that the apparatus has a condensate outlet port, wherein the condensate outlet port is fluidically connected to the second process unit and extends through the pressure jacket, wherein the condensate outlet port is arranged at the bottom of the apparatus so that the condensed reaction product can exit the second process unit at the bottom thereof.

A condensate outlet port required for discharging the separated liquid reaction product (condensate) from the second process unit is preferably arranged at the bottom of the apparatus, in particular at the bottom of the second process unit.

The arrangement of a process gas inlet port at the top and a condensate outlet port at the bottom of the apparatus additionally favours the natural flow direction of the process gas mixture and the condensable reaction product in the vertical direction from top to bottom. The incoming and outgoing pipe sections of the ports are preferably arranged at least partially vertically.

One embodiment of the apparatus according to the invention is characterized in that the apparatus has a cooling media inlet port and a cooling media outlet port, wherein the cooling media inlet port and the cooling media outlet port extend through the pressure jacket and wherein the cooling media inlet port and the cooling media outlet port are fluidically connected to the plate interiors of the first process unit and wherein the cooling media inlet port is arranged at the bottom of the first process unit and the cooling media outlet port is arranged at the top of the first process unit so that the cooling medium can enter the first process unit at the bottom and the cooling medium can exit the first process unit at the top.

As a result of the arrangement of a cooling media inlet port at the bottom and a cooling media outlet port at the top of the first process unit and with traversal from bottom to top the first process unit can even in the event of failure of a cooling water circulation pump continued operating, given appropriate arrangement of the forced circulation pump and the cooling medium reservoir. The incoming and outgoing pipe sections of the ports are preferably arranged at the side of the apparatus and at least partially horizontally.

One embodiment of the apparatus according to the invention is characterized in that a distributor system fluidically connected to the plate interiors is arranged in the interior of the pressure jacket, wherein the distributor system is configured for distributing cooling medium entering the apparatus to the plate interiors of the first process unit.

The distributor system is in particular fluidically connected to a cooling media inlet port of the apparatus. Cooling medium entering the apparatus via a cooling media inlet port is distributed to the individual plates, in the present case plate interiors of these plates, via the distributor system.

One embodiment of the apparatus according to the invention is characterized in that a collector system fluidically connected to the plate interiors is arranged in the interior of the pressure jacket, wherein the collector system is configured for collecting cooling medium exiting the plate interiors of the first process unit.

The collector system is in particular fluidically connected to a cooling media outlet port of the apparatus. Cooling medium exiting the plate interiors of the individual plates is collected via the collector system. The collected cooling medium subsequently exits the apparatus via the cooling media outlet port.

BRIEF DESCRIPTION OF THE DRAWINGS

The invention is hereinbelow more particularly elucidated by exemplary embodiments. In the following detailed description reference is made to the accompanying figures which form a part of the exemplary embodiments and which contains an illustrative representation of specific embodiments of the invention. In this connection, direction-specific terminology such as "top", "bottom", "front", "back", etc., is used with reference to the orientation of the described figure. Since components of embodiments may be positioned in a multiplicity of orientations, the direction-specific terminology is used for elucidation and is in no way limiting. A person skilled in the art will appreciate that other embodiments may be used and structural or logical changes may be undertaken without departing from the scope of protection of the invention. The following detailed description is therefore not to be understood in a limiting sense, and the scope of protection of the embodiments is defined by the accompanying claims. Unless otherwise stated, the drawings are not true to scale.

In the following description and in the drawings identical elements are described with identical reference numerals. Arrows illustrate the flow direction of the process gas mixture, of the condensed reaction product, of the residual gas and of the cooling medium.

In the Figures:

FIG. 1 shows a highly simplified schematic representation of an apparatus according to a first example of the invention and FIG. 2 shows a highly simplified schematic representation of an apparatus according to a second example of the invention.

DETAILED DESCRIPTION OF THE PREFERRED EMBODIMENTS

Figure 1:
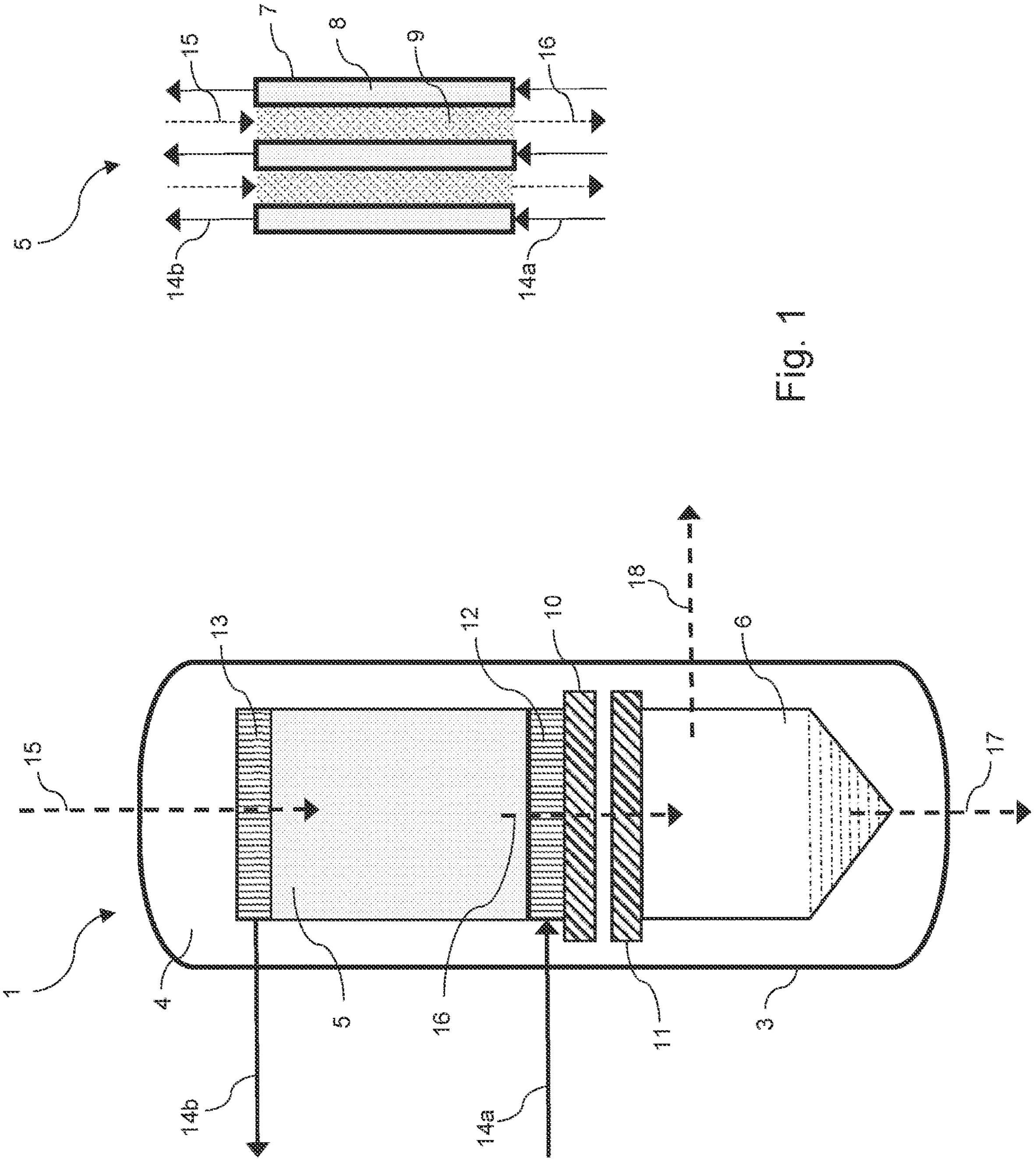

FIG. 1 shows a highly simplified schematic representation (outline sketch) of an apparatus 1 according to a first example of the invention. The apparatus 1 is shown in a front view on the left-hand side of the figure. FIG. 1 further shows a side view of a portion of the first process unit 5 on the right-hand side of FIG. 1.

The apparatus 1 according to FIG. 1 shows a pressure jacket 3 in whose interior 4 a first process unit 5 and a second process unit 6 are arranged. The first process unit 5 is arranged in an upper portion of the interior while the second process unit 6 is arranged in a lower portion of the interior 4 and below the first process unit 5. Both process units 5 and 6 are fluidically interconnected, for example via corresponding pipe conduits (not shown).

The first process unit 5 fulfills the function of condensing a condensable reaction product from a process gas mixture 15 which is introduced into the first process unit from above via a process gas inlet port (not shown). The process gas inlet port extends through the pressure jacket 3, i.e. establishes a connection between the exterior of the apparatus and the first process unit 5. The process gas mixture is for example a gaseous mixture from a methanol synthesis starting from synthesis gas as the reactant gas mixture. In the first process gas unit 5 the process gas mixture flows from top to bottom and is thereby cooled, with the result that reaction product, for example raw methanol (methanol-water mixture), condenses out of the process gas mixture.

The cooling of the process gas mixture is effected via a cooling medium which is introduced into the first process unit via a cooling media inlet port (not shown) as cooling medium 14*a*. The cooling media inlet port extends through the pressure jacket 3, i.e. establishes a connection between the exterior of the apparatus and the first process unit 5. The cooling medium 14*a* is cooling water for example. The cooling medium 14*a* is heated and/or evaporated by the cooling of the process gas mixture 15. It is discharged from the first process unit 5 as exhausted cooling medium 14*b* via a cooling media outlet port (not shown).

The first process unit 5 is in the form of a plate heat exchanger. Accordingly the first process unit 5 has a multiplicity of traversable (heat exchanger) plates 7, the arrangement of which is shown in a side view on the right-hand side. Only three plates 7 are shown by way of example whereas the first process unit 5 would in practice have a substantially greater number of plates 7. The totality of the plates may also be referred to as a plate packet. The plates 7 are vertically arranged and have plate interiors 8. The plate interiors 8 are traversable by the cooling medium. The cooling medium 14*a* enters the first process unit 5 in a bottom region, traverses the plates 7 from bottom to top in the vertical direction through the plate interiors and subsequently exits the plates 7 in a top region of the first process unit. In a particularly advantageous embodiment the plates 7 are not in the form of straight plates as shown here but rather in the form of pillow plates. In this embodiment the first process unit would accordingly be in the form of a pillow plate heat exchanger.

The traversable plates 7 are arranged vertically and spaced apart from one another in parallel. Respective adjacent plates 7 thus define a plate interspace 9, represented by the dotted area. A plate interspace may also be defined by the freely traversable space between a plate 7 and a wall (not shown) of the first process unit 5. In any case the first process unit 5 is configured in such a way and comprises means such that the plate interspaces 9 are traversable from top to bottom by the process gas mixture 15. A liquid reaction product condenses from the process gas mixture 15 through indirect cooling by the cooling medium 14*a* run in countercurrent in the plate interiors. This results in a mixture 16 of condensate (liquid reaction product) and uncondensed residual gas which is discharged from the first process unit 5 in the bottom region thereof on the side of the plate interspaces. This mixture is transferred into the second process unit 6 via a fluidic connection, such as a pipe conduit or a more complex system composed of a plurality of pipe conduits and optionally collectors and distributors (not shown).

The cooling medium 14*a* supplied via the cooling media inlet port (not shown) is distributed to the individual plates 7 or respectively plate interiors 8 via a distributor system 12 (horizontally shaded area). The exhausted cooling medium 14*b*, for example heated cooling water, is combined from the plate interiors 8 via a collector system 13 and withdrawn from the apparatus via the cooling media outlet port (not shown).

The first process unit 5 is connected to the pressure jacket 3 of the apparatus 1 by means of a support structure. The support structure is arranged below the first process unit 5 and is thus in the form of a propping means 10. The propping means is mechanically connected both to a lower region or bottom region of the first process unit 5 and to an inside of the pressure jacket 3 (not shown). The type of mechanical connection may be any suitable type of a mechanical connection, for example a weld connection. Due to the arrangement of the support structure as a propping means 10 below the first process unit 5 said unit can accordingly expand freely upwards within the interior 4 in the case of heating in operation.

The second process unit 6 is arranged below the first process unit 5 in the interior 4. The second process unit 6 is in the form of a gas-liquid separator. Accordingly the mixture of condensate (liquid reaction product) and residual gas introduced into the second process unit 6 is separated into a liquid and gaseous phase therein. In other words the liquid phase is separated from the biphasic mixture. In the example shown the gas-liquid separator is in the form of a cylindrical container having a conically tapering bottom. The residual gas contains, for example in the case of a methanol synthesis, unconverted synthesis gas, inert uncondensable constituents, unseparated raw methanol and uncondensable byproducts. The residual gas is withdrawn from the second process unit via a residual gas outlet port (not shown). The residual gas outlet port extends through the pressure jacket 3 of the apparatus 1.

Separated condensate (liquid reaction product) 17 is obtained in the bottom of the second process unit 6. Said condensate is withdrawn from the second process unit 6 via a condensate outlet port (not shown) and sent for further processing. The condensate outlet port extends through the jacket 3 of the apparatus and essentially represents a connection between an outlet of the second process unit 6 and the outer environment of the apparatus 1.

The second process unit 6 is connected to the pressure jacket 3 of the apparatus 1 by means of a support structure. The support structure is arranged above the second process unit 6 and is thus in the form of a suspending means 11. The suspending means 11 is mechanically connected both to an upper region or top region of the second process unit 6 and to an inside of the pressure jacket 3. The type of mechanical connection may be any suitable type of a mechanical connection, for example a weld connection. Due to the arrangement of the support structure as a suspending means 11 above the second process unit 6 said unit can accordingly expand freely downwards within the interior 4 in the case of heating in operation.

Figure 2:
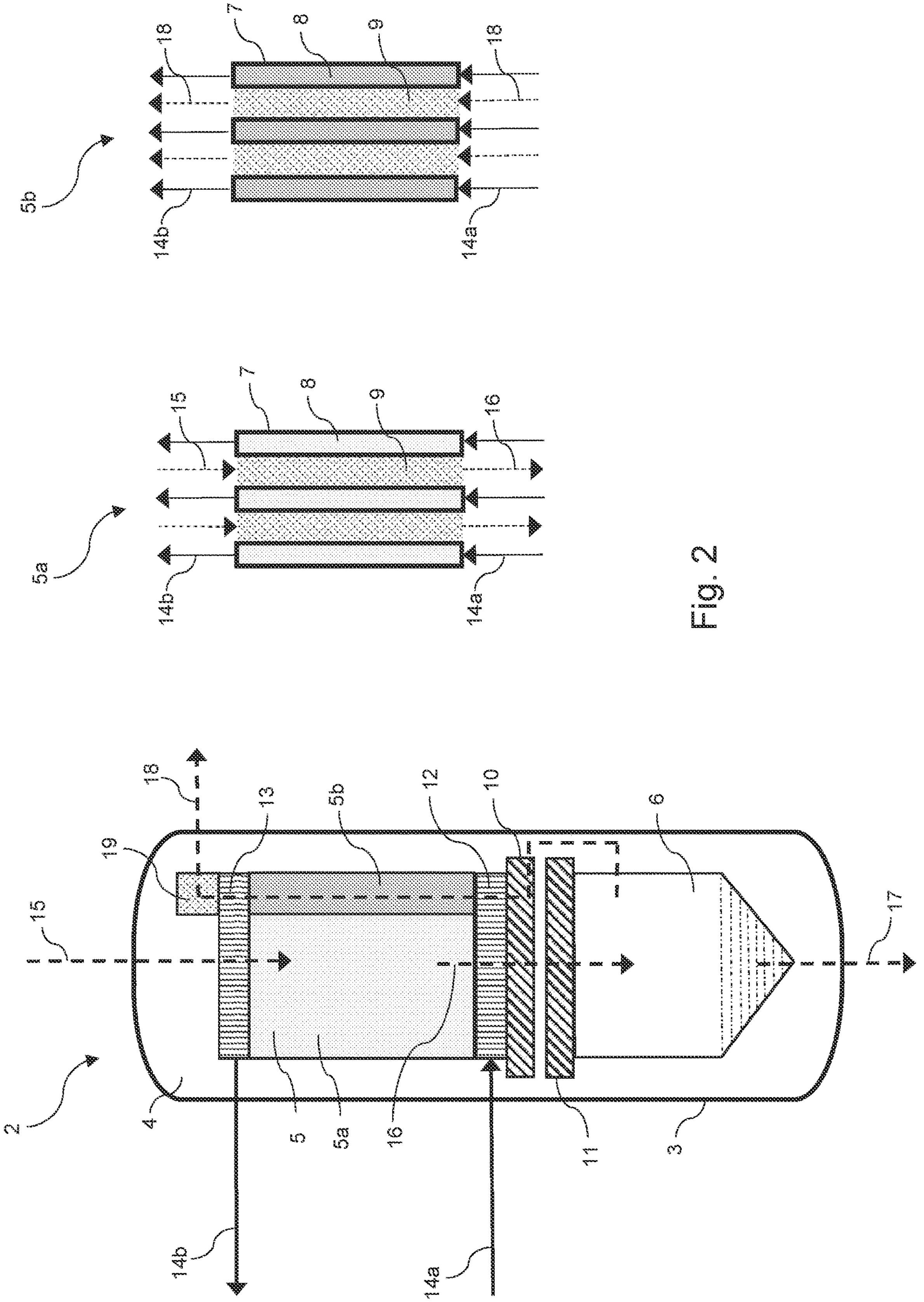

FIG. 2 shows a highly simplified schematic representation (outline sketch) of an apparatus 2 according to a second example of the invention. The apparatus 2 is shown in a front view on the left-hand side of the figure. FIG. 2 further shows a side view of a portion of the first compartment 5*a* of the first process unit 5 in the middle of FIG. 2. FIG. 2 further shows a side view of a portion of the second compartment 5*b* of the first process unit 5 on the right-hand side of FIG. 2.

Elements already shown in FIG. 1 with identical reference numerals to elements in FIG. 2 fulfill, in relation to the example in FIG. 2, the same function as in the example of FIG. 1 and are therefore not elucidated in detail again.

The apparatus 2 according to the example as shown in FIG. 2 comprises a first process unit 5 having two different compartments 5*a* and 5*b*. The apparatus 2 further comprises a droplet separator (demister) 19 as a drying apparatus.

The compartments 5*a* and 5*b* of the first process unit do not fundamentally differ in terms of their structural features. Both compartments have (heat exchanger) plates 7 arranged vertically and parallel to one another. These are traversed from bottom to top in the vertical direction by a cooling medium 14*a* on their plate inside 8. However, in contrast to the first compartment 5*a* the plate interspaces 9 of the second compartment 5*b* are not traversed by a process gas mixture 15 nor are they traversed from top to bottom in the vertical direction. On the contrary, the plate interspaces 9 of the second compartment 5*b* are traversed from bottom to top in the vertical direction by residual gas 18 discharged from the second process unit 6. An aftercooling of the residual gas 18 is effected by cooling with the cooling medium 14*a* on the plate insides 8 of the compartment 5*b*. This aftercooling causes further condensate (liquid reaction product) to condense out of the previously saturated residual gas 18. The condensate formed flows downwards on the plate interspace side of the compartment 5*b* and passes via a corresponding fluidic connection (not shown) into the second process unit 6 in the form of a gas-liquid separator and is therein separated in the bottom of the second process unit 6 with otherwise obtained condensate 17. The efficiency of the separation is thus improved over the apparatus 1 since residual gas not saturated with gaseous reaction product is withdrawn from the apparatus.

In the second compartment 5*b* the residual gas 18 and the cooling medium 14*a*, 14*b* are run in cocurrent.

According to the apparatus 2 the efficiency of the separation is further improved by the arrangement of a drying apparatus, here of a droplet separator (demister) 19, above the second compartment 5*b*. The droplet separator 19 is fluidically connected to the second compartment 5*b* of the first process unit 5. Smaller droplets of condensed reaction product are agglomerated into larger drops therein. This increases the "weight" of these droplets which then also flow downwards under gravity via the plate interspaces 9 of the second compartment and pass into the second process unit 6. Liquid droplets not agglomerable into drops are evaporated in the upper region of the second compartment 5*b* and/or in the droplet separator 19. This ensures that a purely gaseous residual gas 18 is discharged from the apparatus 2.

LIST OF REFERENCE SYMBOLS

1, 2 Apparatus
3 Pressure jacket
4 Interior
5 First process unit
5*a* First compartment (of the first process unit)
5*b* Second compartment (of the first process unit)
6 Second process unit
7 (Heat exchanger) plate
8 Plate interior
9 Plate interspace
10 Propping means (support structure)
11 Suspending means (support structure)
12 Distributor system
13 Collector system
14*a*, 14*b* Cooling medium
15 Process gas mixture
16 Reaction product (condensate) and residual gas
17 Reaction product (condensate)
18 Residual gas
19 Droplet separator (drying apparatus)

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus for separating a condensable reaction product from a process gas mixture comprising:

a pressure jacket having an interior, wherein at least a first process unit and a second process unit are fluidically interconnected and arranged one atop the other in the interior;

wherein the first process unit is configured for condensing the reaction product from the process gas mixture and the first process unit is in the form of a plate heat exchanger and the first process unit comprises a multiplicity of plates arranged vertically and parallel to one another with traversable plate interiors and plate interspaces are present between adjacent plates, wherein the plate interspaces are traversable from top to bottom by the process gas mixture and the plate interiors are traversable, from bottom to top, by a cooling medium;

the second process unit arranged below the first process unit, wherein the second process unit is fluidically connected to the plate interspaces of the first process unit and wherein:

the second process unit is in the form of a gas-liquid separator and is configured for separating the condensed reaction product obtainable in the first process unit from a residual gas, wherein the first process unit comprises a first and a second compartment, wherein said compartments are configured such that plate interspaces of the first compartment are traversable from top to bottom by the process gas mixture and plate interspaces of the second compartment are traversable from bottom to top by a residual gas dischargeable from the second process unit, as a result of which further reaction product is condensable from the residual gas in the plate interspaces of the second compartment; and wherein the interior of the pressure jacket has a drying apparatus arranged therein, wherein the drying apparatus is fluidically connected to the plate interspaces of the second compartment.

2. The apparatus according to claim 1, wherein the plates of the first process unit are in the form of pillow plates.

3. The apparatus according to claim 1, wherein the drying apparatus is arranged above the second compartment of the first process unit.

4. The apparatus according to claim 1, wherein the apparatus has a process gas inlet port, wherein the process gas inlet port is fluidically connected to the plate interspaces of the first process unit and extends through the pressure jacket, wherein the process gas inlet port is arranged at the top of the apparatus so that the process gas mixture can enter the first process unit at the top thereof.

5. The apparatus according to claim 1, wherein the apparatus has a condensate outlet port, wherein the condensate outlet port is fluidically connected to the second process unit and extends through the pressure jacket, wherein the condensate outlet port is arranged at the bottom of the apparatus so that the condensed reaction product can exit the second process unit at the bottom thereof.

6. The apparatus according to claim 1, wherein the apparatus has a cooling media inlet port and a cooling media outlet port, wherein the cooling media inlet port and the cooling media outlet port extend through the pressure jacket and wherein the cooling media inlet port and the cooling media outlet port are fluidically connected to the plate interiors of the first process unit and wherein the cooling media inlet port is arranged at the bottom of the first process unit and the cooling media outlet port is arranged at the top of the first process unit so that the cooling medium can enter the first process unit at the bottom and the cooling medium can exit the first process unit at the top.

* * * * *